United States Patent

Hagimori et al.

[11] Patent Number: 5,969,887
[45] Date of Patent: Oct. 19, 1999

[54] LENS HOLDING STRUCTURE, ITS ASSEMBLING METHOD AND ITS DIMENSION DETERMINING METHOD

[75] Inventors: Hitoshi Hagimori, Ikoma; Yoshifumi Harada, Hashimoto; Hiroshi Sugiyama, Tondabayashi; Haruki Yoshida; Hideki Nagata, both of Sakai, all of Japan

[73] Assignee: Minolta Co., Ltd., Osaka, Japan

[21] Appl. No.: 09/057,478

[22] Filed: Apr. 9, 1998

[30] Foreign Application Priority Data

Apr. 10, 1997 [JP] Japan ................... 9-092266
Apr. 10, 1997 [JP] Japan ................... 9-092276

[51] Int. Cl.$^6$ ................... G02B 7/02
[52] U.S. Cl. ................... 359/819; 359/811
[58] Field of Search ................... 359/819, 811; 353/100; 362/455

[56] References Cited

U.S. PATENT DOCUMENTS 5,757,559  5/1998  Nomura et al. ................... 359/819

*Primary Examiner*—Hung Xuan Dang
*Attorney, Agent, or Firm*—McDermott, Will & Emery

[57] ABSTRACT

A structure for holding lenses in which they are inserted into a lens frame in an axial direction thereof for their mounting thereon, and in which a lens that is first inserted into the lens frame is fixed thereto by caulking a part of the lens frame against the lens, so that an enlargement in a radial direction of the lens frame is prevented. The lens frame has three through-holes in a circumferential direction with an equal space therebetween in which the through-holes form around an intermediate position thereof relative to the axial direction, a stepped surface on a first end opposite a second end from which the lens is inserted, and a partial caulking projection which forms inside each hole as a part of the lens frame. After the first lens is inserted from the second end into the lens frame, the partial caulking projection is thermally caulked against a periphery, of the lens, which is downstream relative to the direction in which the lens is inserted, so that the first lens is held between the stepped surface and the partial caulking projection.

10 Claims, 7 Drawing Sheets

LENS HOLDING STRUCTURE, ITS ASSEMBLING METHOD AND ITS DIMENSION DETERMINING METHOD

This application is based upon applications Nos. 9-92266 and 9-92276 filed in Japan, the contents of which are hereby incorporated by reference.

BACKGROUND OF THE INVENTION

1. Field of the Invention

The present invention generally relates to a lens holding structure, a method for assembling the lens holding structure, and a method for determining a dimension of the lens holding structure, and particularly relates to the lens holding structure in which the lens is held inside a lens frame by caulking, to the assembling method by caulking, to the lens holding structure in which an optical axis of the lens and a center of the lens frame can be aligned to each other, and to the method for determining the dimension of the lens holding structure.

2. Description of the Related Arts

Figure 1:
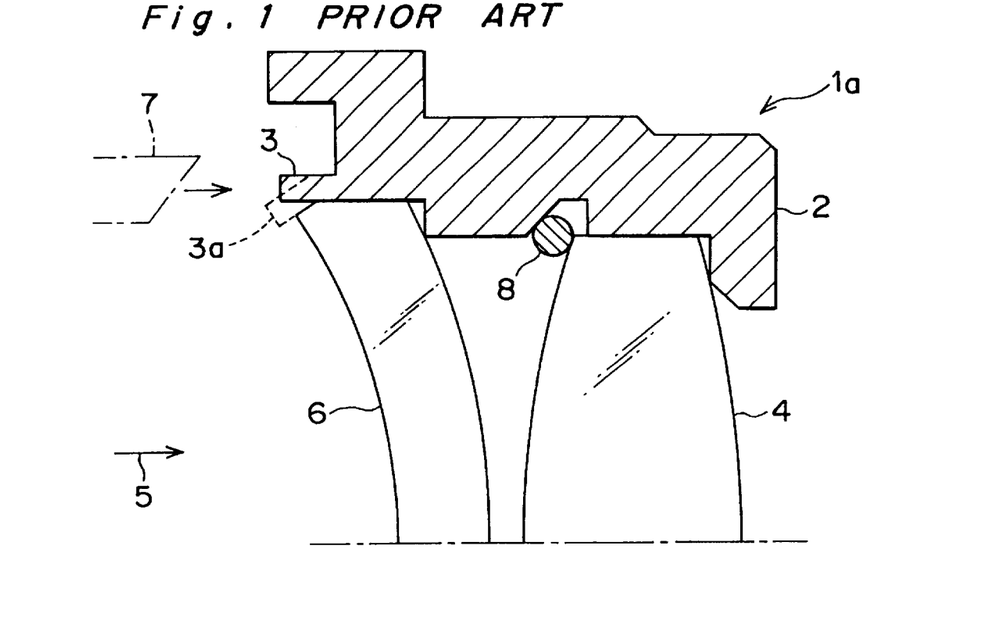
FIG. 1 is a sectional view showing a conventional lens holding structure.
Figure 2:
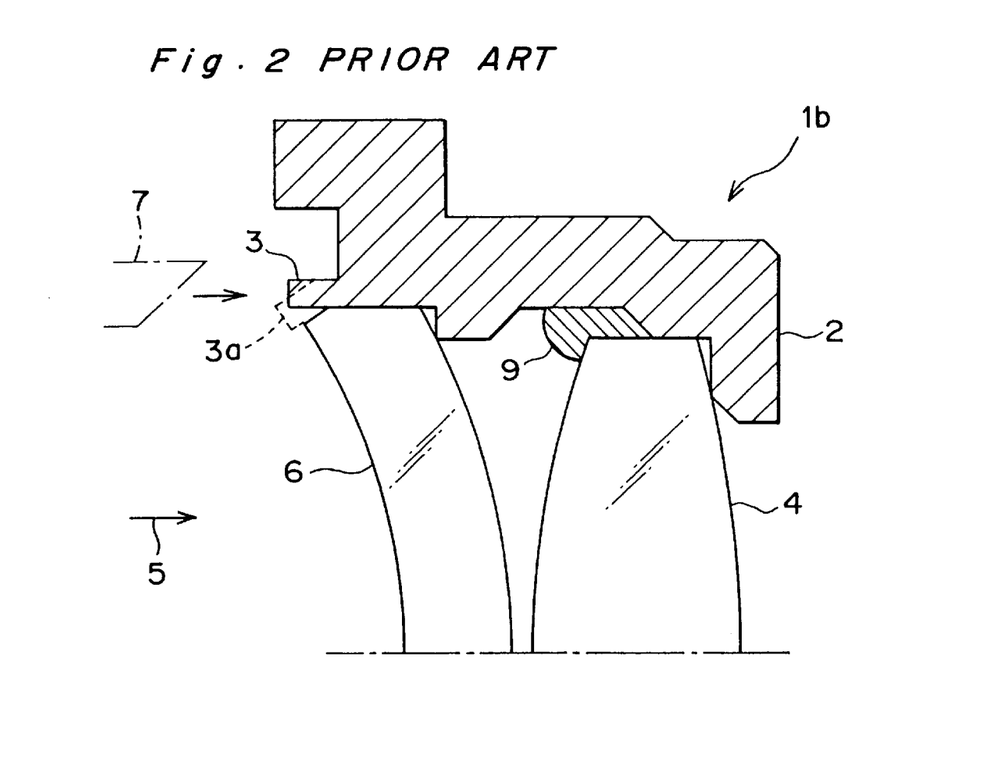
FIG. 2 is a sectional view showing a conventional lens holding structure.

A lens holding structure 1a and a lens holding structure 1b, as shown in the sectional views of FIGS. 1 and 2, have been conventionally used, in which a plurality of lenses 4 and 6 are inserted into and are mounted on a lens frame 2 in the same axial direction 5 that is shown by an arrow 5 in the figures. In the lens holding structure 1a or 1b, the first lens 4 is first mounted on the lens frame 2 by inserting it thereinto, and then the second lens 6 is mounted on the lens frame 2 by inserting it thereinto, both in the same direction 5.

After inserting the first lens 4 inside the lens frame 2 in the direction 5, the first lens 4 is fixed to the lens frame 2 by using a C-ring 8, engaging a downstream peripheral edge of the first lens 4 relative to the direction 5, as shown in FIG. 1, or by using an adhesive 9, locating on a side of a downstream peripheral edge of the first lens 4 relative to the direction 5, as shown in FIG. 2. or by using an unshown screw ring, etc.

Next, the second lens 6 is inserted inside the lens frame 2 in the same axial direction 5, and the second lens 6 is fixed to the lens frame 2 in such a way that a deformable caulking portion 3 which extends around a lens inserting peripheral edge of the lens frame 2 is thermally deformed by a heated jig 7. That is, the deformable caulking portion 3 is pressed against a downstream peripheral edge of the second lens 6 in the axial direction 5 so that the deformed caulking portion 3a presses the second lens 6 against a stepped portion, located on an upstream side relative to the deformable caulking portion 3a, of the lens frame 2.

In this manner, the second lens 6 is fixed to the lens frame 2 by caulking the deformable caulking portion 3a against the downstream peripheral edge of the second lens 6, with a high operation efficiency.

However, in respect of the first lens 4 which is first installed inside the lens frame 2, it is not practicable to fix the first lens 4 to the lens frame 2 by caulking. In order to fix the first lens 4 to the lens frame 2 by caulking, it is necessary to form a caulking portion, which is pressed against the first lens 4 along the axial direction 5 of the lens frame 2 by a heated jig as mentioned above, on an inner surface around an intermediate position relative to the axial direction of the lens frame 2.

With the construction, however, the outer diameter of the lens frame 2 cannot help but be larger, and at the same time, the outer diameter of the second lens 6 is required to be larger.

Namely, the first lens 4 which is first assembled inside the lens frame 2, before the second lens 6 is assembled therein, cannot be fixed to the lens frame 2 by caulking, without enlarging the lens frame 2 in its radial direction.

Meanwhile, in case that the lens holding structure in which a lens is held by a lens frame thereof for holding the lens, is installed inside an optical device, if the lens has a higher sensitivity in error, i.e. if the error of the lens seriously affects the performance of the optical device as in the aberration thereof, the lens is fixed to the lens frame with an optical axis of the lens being aligned relative to a center of the lens frame in order to enhance the accuracy in position of the lens with respect to the lens frame.

Figure 10:
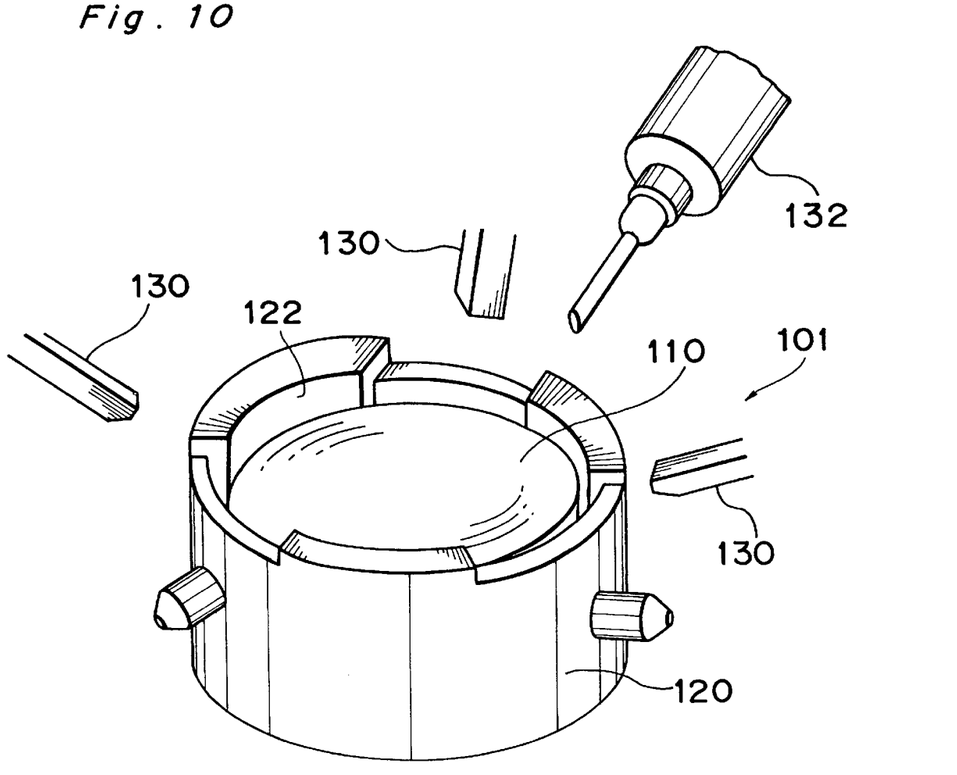
FIG. 10 is an explanatory perspective view showing an assemblage of a lens holding structure according to a fourth embodiment of the present invention, in which this view is also used for explaining a conventional art.
Figure 11:
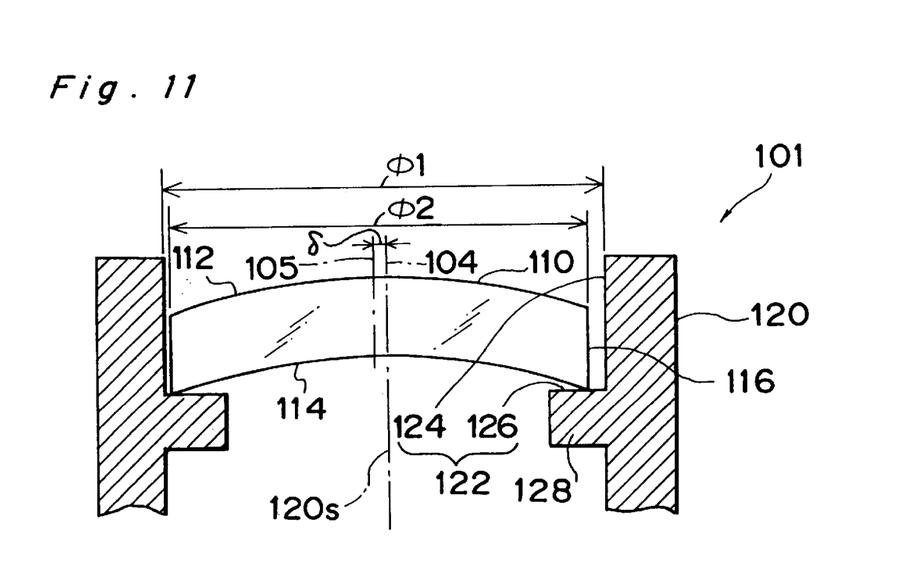
FIG. 11 is a sectional view of FIG. 10.

That is, as shown in a perspective view of FIG. 10 and a sectional view of FIG. 11, the lens frame 120 of the lens holding structure 101 has a projection 128 which projects inward and has a contact surface 126 with which a peripheral surface 114 on one side of the lens 110 contacts so as to position the lens 110 in the optical direction, and has an inner peripheral surface 124 with an inner diameter ø1 that is greater than an outer diameter ø2 of a lens 110. In the arrangement, both the inner peripheral surface 124 and the contact surface 126 constitute a lens holding part 122, of the lens frame 120, for holding the lens 110.

The lens 110 is fixed to the lens frame 120 with the above construction as follows.

That is, first, the lens 110 is inserted to the side of the lens holding part 122 of the lens frame 120, and the lens 110 is put on the contact surface 126 of the lens holding part 122.

Next, the lens 110 is properly moved relative to the contact surface 126 thereof in the radial direction of the lens 110 by using a lens pushing rod 130 as shown in FIG. 10, so that the lens 110 is positioned relative to the lens frame 120 with a condition in which a center of the lens frame 120 is aligned to an optical axis of the lens 110.

Next, using an adhesive applicator 132, an adhesive is filled between the lens holding part 122 and the lens 110 in order to fix the lens 110 to the lens holding part 122 of the lens frame 120, with the lens 110 being held in position relative to the lens holding part 122.

In the arrangement, there is a clearance or allowance in alignment (ø1−ø2) between the inner peripheral surface 124 of the lens frame 120 and the outer peripheral surface of the lens 110. The allowance in alignment (ø1−ø2) is the so-called "alignment allowance" therebetween. Within the alignment allowance, it is possible to adjust the lens 110 relative to the lens holding part 122 of the lens frame 120 so as to realize the alignment therebetween.

Generally, in case that the lens 110 is made of glass, it is manufactured, for example, by fusing, cutting and/or pressing the lens material so that the outer configuration thereof is roughly processed; then by grinding, lapping and/or polishing both surfaces 112 and 114 of the lens 110; and then by performing a centering of the lens. The "centering" is a work for finding out an optical axis, which connects a center of one curved surface of the lens and a center of the other curved surface thereof with each other, of the lens, and for abrading and rounding the lens into a predetermined peripheral configuration about the optical axis thereof so as not to be decentered from the optical axis.

The centering work of the lens 110 is carried out as follows.

Figure 12:
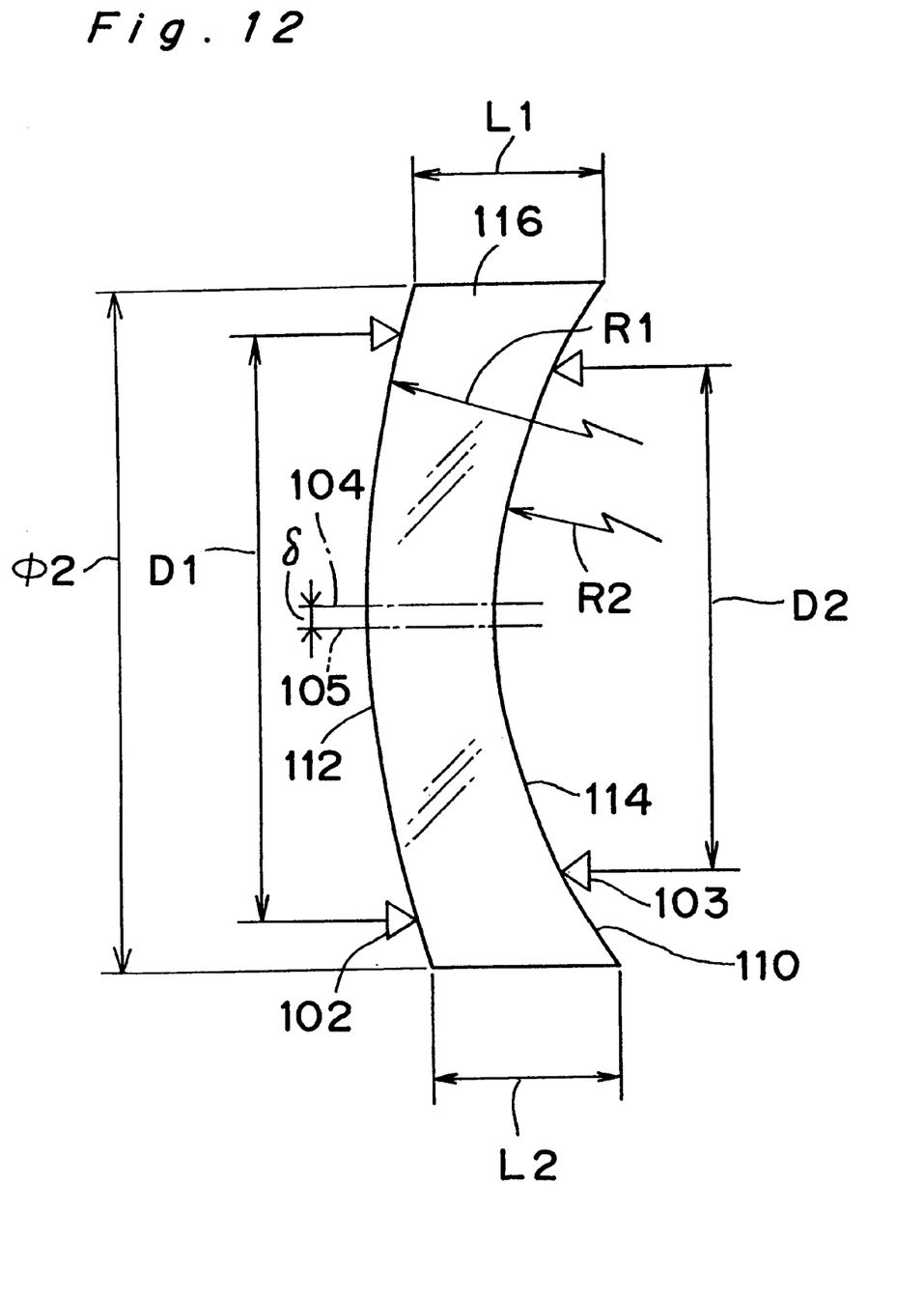
FIG. 12 is a sectional view of a lens used in the lens holding structure shown in FIG. 10.

As shown in a sectional view of FIG. 12, first, both surfaces 112 and 114 of the lens 110 are held or pinched by a pair of holders 102 and 103.

Next, the lens 110 is rotated about its rotation axis 105 while the peripheral surface 116 of the lens 110 is abraded or ground. Through this step, the difference between the axial lengths L1 and L2 on the peripheral surface 116 of the lens 110 is eliminated so that the optical axis 104 of the lens 110 is made to come to a center of the lens 110 with the optical axis 104 thereof being coincident with the rotation axis 105 of the lens 110.

However, generally, there occurs a decentering of the lens to some extent in case that the lens is a mass-produced lens. That is, the optical axis 104 of the lens 110 and the rotation axis 105 thereof do not accurately correspond to each other, and the optical axis 104 of the lens 110 and the rotation axis 105 thereof are spaced from each other by a distance δ, as shown in FIG. 12.

In case that the decentering amount δ is larger than the alignment allowance (ø1–ø2), it is not possible to align the optical axis of the lens 110 with the center of the lens frame 120.

On the other hand, in case that the decentering amount δ is smaller than the alignment allowance (ø1–ø2), it is possible to align the optical axis of the lens 110 with the center of the lens frame 120. In this case, however, the inner diameter ø1 of the inner peripheral surface 124 of the lens holding part 122 becomes unnecessarily larger than is required. In other words, the size or dimension of the lens frame 120 in the radial direction is unnecessarily large, and this prevents a miniaturization of the lens holding structure and thus any apparatus in which the lens holding structure is used.

It is possible to reduce the decentering amount δ of the lens 110, by carefully performing the centering work of the lens 110. Generally speaking, in case that the lens is mass-produced, there is a tendency in which there is a variation in the decentering amount δ to a certain extent. Therefore, conventionally, in order to able to align the lens 110 relative to the lens frame 120 in view of the variation in the decentering amount δ, the alignment allowance (ø1–ø2) has been selected experimentally or by trial and error; however, the alignment allowance (ø1–ø2) is liable to be too large which in turn leads to an unnecessarily large lens holding structure, and thus any apparatus or device in which the lens holding structure is used.

SUMMARY OF THE INVENTION

Accordingly, it is an object of the present invention to provide a lens holding structure in which a plurality of lenses are mounted on a lens frame thereof by inserting them into the lens frame in the same axial direction, and in which the lens that is first inserted into the lens frame is fixed to the lens frame by caulking, without accompanying an enlargement of the lens frame in the radial direction of the lenses.

It is another object of the present invention to provide a method for assembling the lens holding structure in which the plurality of lenses are held by the lens frame, and in which the lens that is first inserted into the lens frame is fixed to the lens frame by caulking.

It is still another object of the present invention to provide the lens holding structure with a moderate alignment allowance which enables the optical axis of the lens and the center of the lens frame to be aligned to each other.

It is still another object of the present invention to provide a method for determining the dimension of the lens holding structure.

In accomplishing these and other objects of the present invention, in one aspect thereof, there is provided a lens holding structure comprising: a lens frame; and a plurality of lenses which are held by the lens frame, in which at least a pair of the lenses are mounted on the lens frame by inserting them into the lens frame in a same axial direction of the lens frame, wherein the lens frame comprises a plastically deformable part which is provided generally at a central part thereof relative to the axial direction, in which the central part thereof relative thereto generally corresponds to a location of a first lens which is first mounted on the lens frame, and in which the plastically deformable part is exposed outside, and wherein the plastically deformable part is deformed plastically toward the first lens so that the first lens is fixed relative to the lens frame.

According to the structure, when the plastically deformable part is made to deform plastically toward the first lens, the plastically deformable part engages the first lens, the lens is prevented from moving axially relative to the lens frame, and the first lens is fixed to the lens frame. The plastically deformable part can be constructed within a radial dimension of the lens frame, and there is no need of enlarging the outer diameter of the second lens which is mounted on the lens frame by inserting it thereto after the first lens is mounted on the lens frame by inserting it thereto.

Namely, according to the structure, there is provided a lens holding structure in which a plurality of lenses are mounted on a lens frame by inserting them into the lens frame in the same axial direction, and in which the lens that is first inserted into the lens frame is fixed to the lens frame by caulking, without accompanying an enlargement of the lens frame in the radial direction of the lenses.

By the way, typically, the plastically deformable part can be made of a thermoplastic resin material, and the caulking can be a thermal caulking.

Alternatively, the plastically deformable part can be made of another material like metal, and the plastically deformable part can be deformed plastically toward the first lens without heating up the plastically deformable part.

In the structure, preferably, the lens frame further comprises a cylindrical wall with a through-hole penetrating the cylindrical wall generally in a radial direction of the first lens and with a partial caulking piece projecting inside the through-hole, wherein the through-hole is defined by an upstream inner surface relative to the same axial direction and by a downstream inner surface relative thereto, in which the partial caulking piece is located on a side of the upstream inner surface and projects, from a vicinity of a downstream edge of the first lens, in a direction opposite to the same axial direction, and in which the downstream inner surface slants inwardly relative to the same axial direction, and wherein the partial caulking piece is deformed plastically, as the plastically deformable part, generally in the radial direction of the first lens so that the partial caulking piece engages the downstream edge of the first lens.

According to the structure, the partial caulking piece, as the plastically deformable part, is deformed plastically generally in the radial direction of the first lens, namely inwardly toward the first lens, the plastically deformable part is bent toward the first lens, and the plastically deformable part engages the first lens. Because of this engagement of the plastically deformable part with the first lens, the first lens is prevented from moving relative to the lens frame in a direction opposite to the same axial direction, for example, and the first lens is fixed to the lens frame.

That is, it is possible to fix the first lens relative to the lens frame by caulking, with a simple structure.

In the structure, alternatively, the first lens can have a peripheral groove, wherein the lens frame can have a concave part-which is recessed relative to an outer surface of the lens frame, in which the concave part has a thin partial caulking wall part on a side of the first lens, and in which the concave part is provided at a location corresponding to the peripheral groove of the first lens, and wherein the thin partial caulking wall part can be deformed plastically, as the plastically deformable part, generally in the radial direction of the first lens so that the thin partial caulking wall part engages the peripheral groove of the first lens.

According to the structure, when the thin partial caulking wall part is deformed plastically, generally in the radial direction of the first lens, namely inwardly toward the first lens, by any outer means getting access to the thin partial caulking wall part through a concave space of the concave part, the thin partial caulking wall part for example steals into and engages the peripheral groove of the first lens. Because of this engagement of the thin partial caulking wall part with the peripheral groove of first lens, the first lens is prevented from moving relative to the lens frame in a direction opposite to the same axial direction, for example, and the first lens is fixed to the lens frame.

By the way, the thin partial caulking wall part has a thickness which is smaller than a thickness of a body of the lens frame. Therefore, the plastic deformation easily occurs on the thin partial caulking wall part.

Therefore, it is possible to fix the first lens relative to the lens frame by caulking, with a simple structure.

In the structure, preferably, the lens frame has at least a pair of the plastically deformable parts in a circumferential direction of the lens frame.

According to the structure, at least the pair of the plastically deformable parts are caulked against the lens with the lens contacting the lens frame in both an optical direction of the lens (namely, the axial direction of the lens frame) and a direction perpendicular to the optical direction. Therefore, with the structure, the movement of the lens relative to the lens frame in the optical direction, the movement of the lens relative to the lens frame in the direction perpendicular to the optical direction, the rotation of the lens relative to the lens frame about an optical axis of the lens, and the rotation of the lens relative to the lens frame about an axis perpendicular to the optical axis of the lens, are prevented, respectively.

Consequently, the lens is fixed on the lens frame with a smaller number of steps for fixing the lens thereon.

In accomplishing the above objects of the present invention, in another aspect thereof, there is provided a method for assembling a lens holding structure in which a plurality of lenses are held by a lens frame thereof, in which at least a pair of the lenses are mounted on the lens frame by inserting them into the lens frame in a same axial direction of the lens frame, wherein the lens frame has a plastically deformable part which is provided generally at a central part thereof relative to the axial direction, in which the central part thereof relative thereto generally corresponds to a location of a first lens which is to be first mounted on the lens frame, and in which the plastically deformable part is exposed outside, the method comprising the steps of: providing the first lens into the lens frame in the same axial direction; and deforming the plastically deformable part plastically toward the first lens so that the first lens is fixed relative to the lens frame.

In the method, preferably, the lens frame further comprises a cylindrical wall with a through-hole penetrating the cylindrical wall generally in a radial direction of the first lens and with a partial caulking piece projecting inside the through-hole, wherein the through-hole is defined by an upstream inner surface relative to the same axial direction and by a downstream inner surface relative thereto, in which the partial caulking piece is located on a side of the upstream inner surface and projects, from a vicinity of a downstream edge of the first lens, in a direction opposite to the same axial direction, and in which the downstream inner surface slants inwardly relative to the same axial direction, and wherein the partial caulking piece is deformed plastically, as the plastically deformable part, generally in the radial direction of the first lens so that the partial caulking piece engages the downstream edge of the first lens.

In the method, alternatively, the first lens can have a peripheral groove, wherein the lens frame can have a concave part which can be recessed relative to an outer surface of the lens frame, in which the concave part has a thin partial caulking wall part on a side of the first lens, and in which the concave part is provided at a location corresponding to the peripheral groove of the first lens, and wherein the thin partial caulking wall part can be deformed plastically, as the plastically deformable part, generally in the radial direction of the first lens so that the thin partial caulking wall part engages the peripheral groove of the first lens.

In the method, preferably, the lens frame has at least a pair of the plastically deformable parts in a circumferential direction of the lens frame.

In accomplishing the above objects of the present invention, in still another aspect thereof, there is provided a lens holding structure comprising: a lens frame with a lens holding part which has an inner diameter $\varnothing 1$; and a lens, having an outer diameter $\varnothing 2$ which is smaller than the inner diameter $\varnothing 1$ of the lens frame, in which the lens is supported by the lens holding part of the lens frame, and in which an optical axis of the lens can be aligned with respect to a center of the lens holding part of the lens frame, wherein there is a relation expressed by:

$$3 \times 10^{-3} < Z \times (\varnothing 1 - \varnothing 2)/\varnothing 1 < 10^{-2} \text{ and}$$

$$Z = |D1/(4 \times R1) \pm D2/(4 \times R2)|$$

where $\varnothing 1$ is the inner diameter of the lens holding part of the lens frame; $\varnothing 2$ is the outer diameter of the lens; D1 is a diameter of one of a pair of holders which supports one of a pair of surfaces of the lens at time of centering the lens; D2 is a diameter of the other of the pair of holders which supports the other of the pair of surfaces of the lens at time thereof; R1 is a radius of curvature of the one of the pair of surfaces of the lens; R2 is a radius of curvature of the other of the pair of surfaces of the lens; its plus sign is used where the lens is one of a plane lens, a double-convex lens and a. double-concave lens; and its minus sign is used where the lens is a meniscus lens.

In accomplishing the above objects of the present invention, in still another aspect thereof, there is provided a method for determining a dimension of a lens holding structure which has: a lens frame with a lens holding part which has an inner diameter $\varnothing 1$; and a lens, having an outer diameter $\varnothing 2$ which is smaller than the inner diameter $\varnothing 1$ of the lens frame, in which the lens is supported by the lens holding part of the lens frame, and in which an optical axis of the lens can be aligned with respect to a center of the lens holding part of the lens frame, the method comprising the steps of: determining a shape of the lens; and determining the inner diameter $\varnothing 1$ of the lens holding part of the lens so as to satisfy a relationship expressed by:

$$3 \times 10^{-3} < Z \times (\varnothing 1 - \varnothing 2)/\varnothing 1 < 10^{-2} \text{ and}$$

$$Z = |D1/(4 \times R1) \pm D2/(4 \times R2)|$$

where ø1 is the inner diameter of the lens holding part of the lens frame; ø2 is the outer diameter of the lens; D1 is a diameter of one of a pair of holders which supports one of a pair of surfaces of the lens at time of centering the lens; D2 is a diameter of the other of the pair of holders which supports the other of the pair of surfaces of the lens at time thereof; R1 is a radius of curvature of the one of the pair of surfaces of the lens; R2 is a radius of curvature of the other of the pair of surfaces of the lens; its plus sign is used where the lens is one of a plane lens, a double-convex lens and a double-concave lens; and its minus sign is used where the lens is a meniscus lens.

In the method, the step of determining the shape of the lens is the step in which each parameter and the outer diameter ø2 of the lens are respectively determined for the value of "Z" of the lens.

Generally, in case that the value Z is small and that the optical axis of the lens is not in alignment with the rotation axis thereof at time of centering of the lens, the centering work of the lens becomes difficult. This is because there is a small difference between the axial lengths around the peripheral surface of the lens. Therefore, the alignment error, or the decentering amount, of the lens, becomes comparatively large at time of mass-producing such a lens. Under such a situation, it is necessary to absorb the alignment error of the lens by making the alignment allowance (ø1–ø2) larger.

On the other hand, in case that the value Z is larger, the centering work of the lens is easier. This is because there arises a greater difference between the axial lengths around the peripheral surface of the lens, in case that the optical axis of the lens is not in alignment with the rotation axis thereof at time of centering work of the lens.

Therefore, the alignment error becomes comparatively smaller at time of mass-producing such a lens. Under such a situation, it is possible to absorb the alignment error of the lens, even if the alignment allowance (ø1–ø2) is smaller.

Paying attention to the relation between the alignment allowance (ø1–ø2) and the value of "Z", the inventors et al. examined the mass-produced lenses which are processed with a common accuracy. As a result, the inventors et al. found out the aforementioned relationship between the value "Z" and the alignment allowance (ø1–ø2), as defined by:

$$3\times10^{-3} < Z\times(\text{ø}1-\text{ø}2)/\text{ø}1 < 10^{-2}$$

Therefore, a mass-produced lens which fails in a centering, i.e. a decentering lens, can be mounted on its lens frame with the optical axis of the decentering lens being aligned relative to the center of the lens frame, by determining the dimension of the lens holding structure on the basis of the conditional relation.

That is, the value "Z" and the dimensionless alignment allowance (ø1–ø2)/ø1 are generally inversely proportional to each other. Thus, in case that the value "Z" is small, i.e., in case that the alignment error of the lens 110 is comparatively large, it is possible to make the inner diameter ø1 of the lens holding part of the lens frame large, so as to make the alignment allowance (ø1–ø2)/ø1 large.

On the other hand, in case that the value "Z" is large, i.e., in case that the alignment error of the lens is comparatively small, it is possible to make the inner diameter ø1 of the lens holding part of the lens frame small, so as to make the alignment allowance (ø1–ø2)/ø1 small.

At the second step, based on the dimension of the lens which is determined at the first step, the inner diameter ø1 of the lens holding part of the lens frame is so determined that the above conditional relation is satisfied.

It becomes unnecessary to make the inner diameter ø1 of the lens holding part of the lens frame more than is required by satisfying the above conditional relation.

Also, such an inconvenience does not occur, as the inner diameter ø1 of the lens holding part is too small, the alignment allowance (ø1–ø2) is not sufficient, and it is not possible to align the optical axis of the lens with respect to the center of the lens frame.

Namely, with the aforementioned conditional relation, it is possible to determine the dimension of the lens holding structure so as to keep a suitable alignment allowance (ø1–ø2).

In other words, the lens holding structure which is so constructed as to satisfy the conditional relation, has an appropriate alignment allowance.

DESCRIPTION OF THE PREFERRED EMBODIMENTS

Before the description of the present invention proceeds, it is to be noted that like or corresponding parts are designated by like reference numerals throughout the accompanying drawings.

Referring to FIGS. 3 to 12, a detailed description is made below on four embodiments of the present invention.

Figure 3:
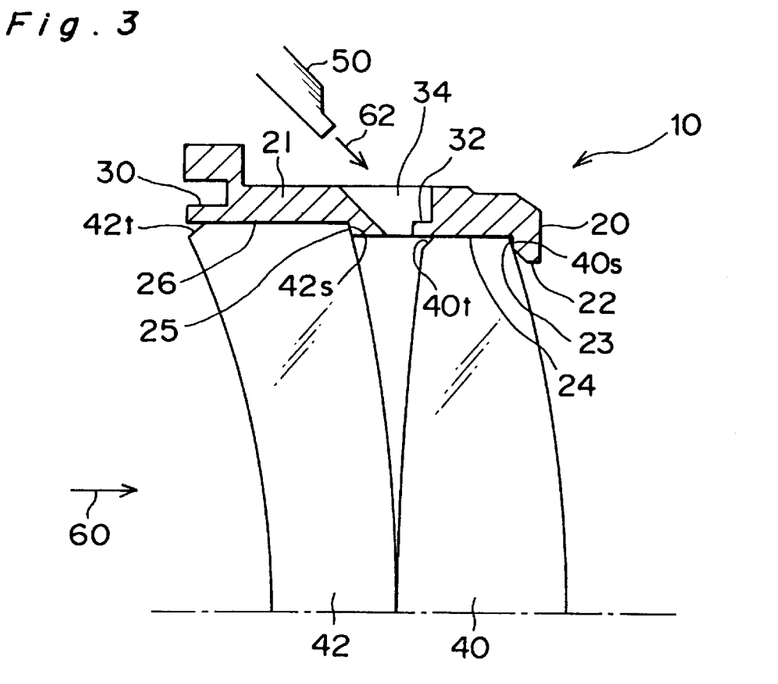
FIG. 3 is a sectional view showing a lens holding structure according to a first embodiment of the present invention.
Figure 4:
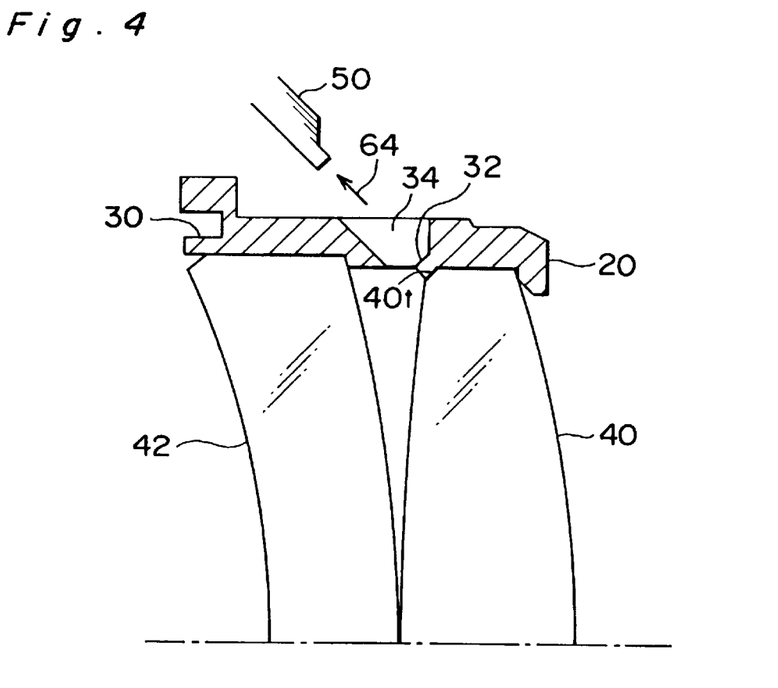
FIG. 4 is a sectional view showing the lens holding structure of FIG. 3.
Figure 7:
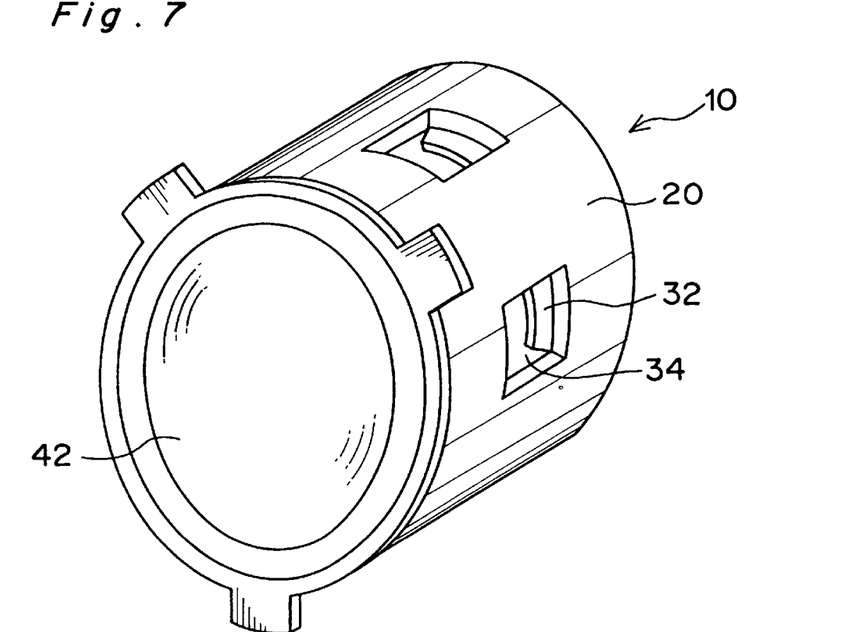
FIG. 7 is a perspective view showing the lens holding structure shown of FIG. 3.

First, referring to FIGS. 3, 4 and 7, it is explained about a lens holding structure and its assembling method, according to a first embodiment of the present invention.

The lens holding structure 10 for holding a plurality of lenses, of the first embodiment, has a lens frame 20; a first lens 40, with an outer diameter relatively smaller, which is held by the lens frame 20; and a second lens 42, with an outer diameter relatively larger, which is held by the same lens frame 20.

The lens frame 20 has a cylindrical wall 21. The cylindrical wall 21 has a first inner peripheral surface 22, a second inner peripheral surface 24, and a third inner peripheral surface 26 in this order which is an order opposite to a direction, shown by an arrow 60, in which the first and second lens 40 and 42 are inserted inside the lens frame 20. An inner diameter of the first inner peripheral surface 22 is smaller than that of the second inner peripheral surface 24, and the inner diameter of the second inner peripheral surface 24 is smaller than that of the third inner peripheral surface 26. All these first through third inner peripheral surfaces 22, 24 and 26 are formed adjacent to each other in axial direction of the lens frame 20.

The inner diameter of the first inner peripheral surface 22 is smaller than an outer diameter of the first lens 40. The inner diameter of the second inner peripheral surface 24 is generally equal to the outer diameter of the first lens 40. The inner diameter of the third inner peripheral surface 26 is generally equal to the outer diameter of the second lens 42.

An entire circumference caulking portion 30 is formed circumferentially around an end, of the cylindrical wall 21, from which the first and second lenses are inserted. As shown in the figures, three through-holes 34 are circumferentially formed with an equal interval therebetween at a location which is generally intermediate in the axial direction of the cylindrical wall 21. A partial caulking projection 32 projecting in a direction generally opposite to the direction in which the lenses 40 and 42 are inserted is formed inside each of the through-holes 34.

As shown in FIGS. 3 and 4, in order to fix the first lens 40 to the lens frame 20, the partial caulking projection 32 is bent inwardly by heat-caulking so that partial caulking projection 32 contacts an edge surface 40t, of the first lens 40, which is a downstream surface relative to the direction 60 in which the lenses 40 and 42 are inserted therein.

More specifically, the lens holding structure 10 is assembled as follows.

That is, as shown in FIG. 3, first, in order to position the first lens 40 relative to the lens frame 20 in the axial direction, the first lens 40 is inserted into the lens frame 20 so that an end surface 40s, of the first lens 40, which is an upstream surface relative to the direction in which the lenses 40 and 42 are inserted therein, contacts a stepped surface 23 of the lens frame 20. As shown in FIG. 3, the stepped surface 23 is positioned at the boundary between the first inner peripheral surface 22 and the second inner peripheral surface 24.

Next, in order to position the second lens 42 relative to the lens frame 20 in the axial direction, the second lens 42 is inserted into the lens frame 20 so that an end surface 42s, of the second lens 42, which is an upstream surface relative to the direction in which the lenses 40 and 42 are inserted therein, contacts a stepped surface 25 of the lens frame 20. As shown in FIG. 3, the stepped surface 25 is positioned at the boundary between the second inner peripheral surface 24 and the third inner peripheral surface 26.

Next, as shown by an arrow 62 in FIG. 3, a heated jig 50 is pressed against the caulking projection 32 of the lens frame 20, through the through-hole 34, so as to soften the caulking projection 32. And then, as shown in FIG. 4, the partial caulking projection 32 is bent toward the first lens 40 and then is pressed against the downstream surface 40t of the first lens 40. Namely, at this step, the downstream surface 40t of the first lens 40 is caulked by the caulking projection 32 so as to press the first lens 40 against the stepped surface 23.

Next, as shown by an arrow 64 of FIG. 4, in order to fix the first lens 40 to the lens frame 20, the heated jig 50 is moved away from the partial caulking projection 32 through the through-hole 34, and then the partial caulking projection 32 is let to be cooled down so that the partial caulking projection 32 is hardened, with the partial caulking projection 32 being pressed against the first lens 40 in the direction in which the first and second lenses lens 40 and 42 are inserted.

Similar to the conventional art exemplified above, from the axial direction of the lens frame 20, an unshown heated jig is pressed against the entire circumference caulking portion 30 which is located at the end of the cylindrical wall 21, the end being a downstream surface relative to the direction in which the lenses 40 and 42 are inserted to the lens frame 20. By pressing the heated jig against the entire circumference caulking portion 30, the entire circumference caulking portion 30 is thermally soften. And then the entire circumference caulking portion 30 is cooled down so that the second lens 42 is fixed relative to the lens frame 20 with a state in which the second lens 42 is pressed against the entire circumference caulking portion 30.

According to the arrangement of the lens holding structure 10, the partial caulking projection 32 which is small in its the radial direction is formed on the lens frame 20. Thus, the first lens 40 which is first installed inside the lens frame 20, preceding the second lens 42, fixed to the lens frame 20 by caulking, without enlarging the lens frame 20 in the radial direction.

Figure 5:
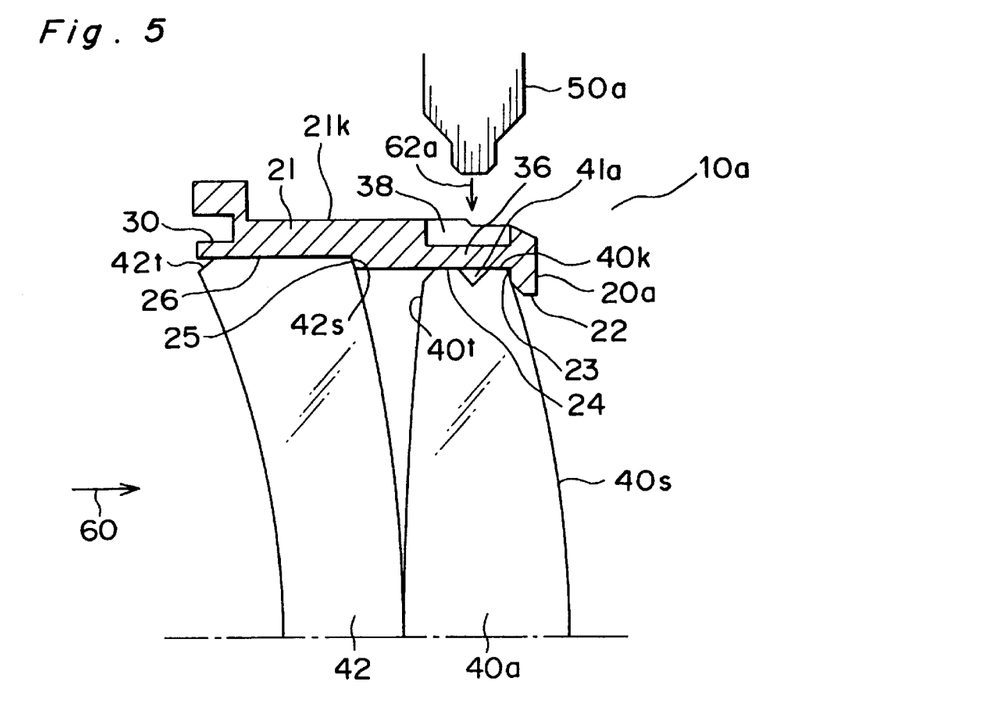
FIG. 5 is a sectional view showing a lens holding structure according to a second embodiment of the present invention.
Figure 6:
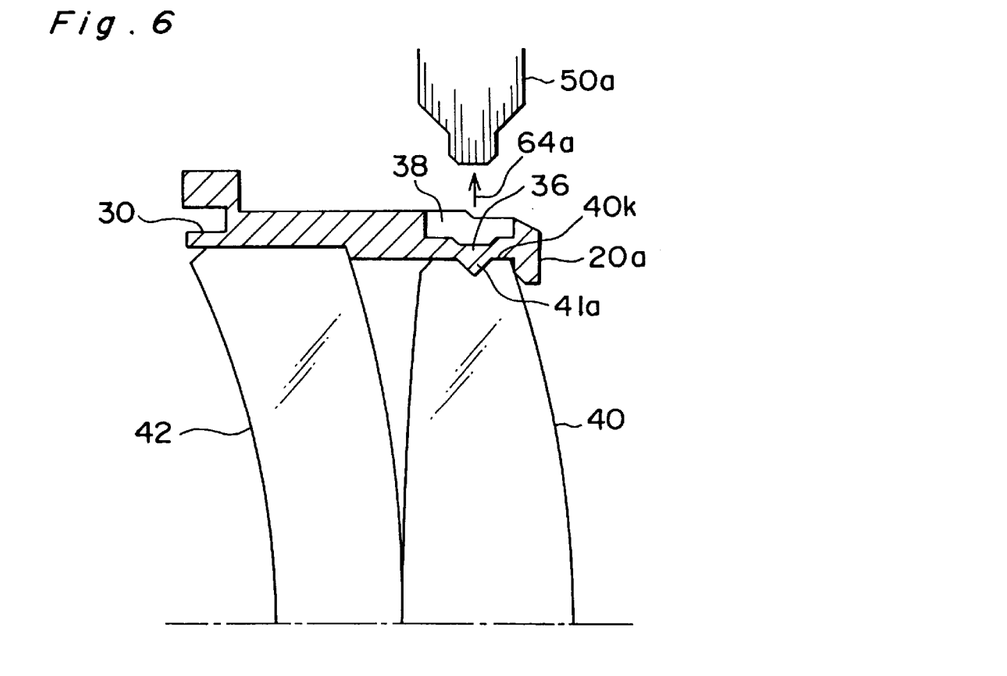
FIG. 6 is a sectional view showing the lens holding structure of FIG. 5.
Figure 8:
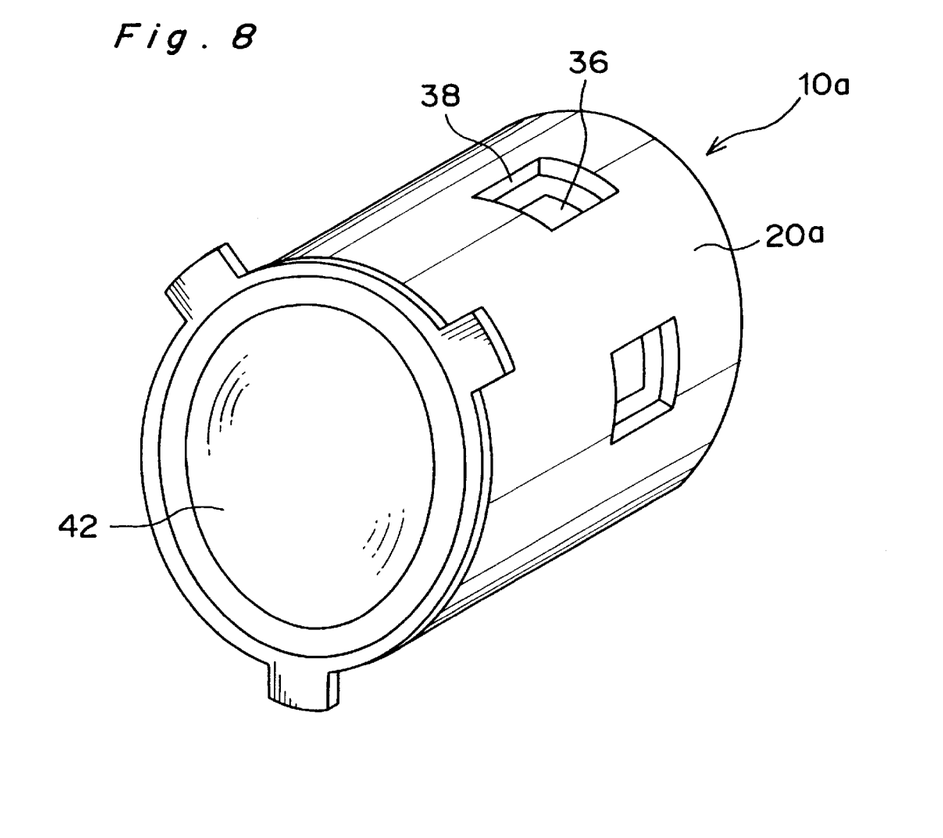
FIG. 8 is a perspective view showing the lens holding structure of FIG. 5.

Next, referring to FIGS. 5, 6 and 8, it is explained about a lens holding structure and its assembling method, according to a second embodiment of the present invention.

The lens holding structure 10a according to the second embodiment does not have a cut-out or through-hole, as described in the first embodiment, on an lens frame thereof. A description of the lens holding structure 10a is especially made on a difference in construction from that of the lens holding structure 10 of the first embodiment. Components or parts of the lens holding structure 10a of the second embodiment which are similar to those of the lens holding structure of the first embodiment, are denoted by the same reference numerals as those of the first embodiment.

Similar to the first embodiment, in the second embodiment, a lens frame 20a has a first inner peripheral surface 22, a second inner peripheral surface 24, and a third inner peripheral surface 26 formed thereon. But instead of the through-hole 34 and the partial caulking projection 32 which are used in the first embodiment, the lens frame 20a has a concave part which is constituted by a concave 38 and a partial caulking wall 36 formed thereon, as shown in FIGS. 5, 6, and 8.

That is, a cylindrical wall 21 of the lens frame 20a has the concave 38 which is formed on a peripheral surface 21k, and has the partial caulking wall 36, with a small thickness, which is adjacent to the concave 38 and which is located radially inwardly of the concave 38.

On the other hand, a V-shaped groove 41a is formed on a peripheral surface 40k of the first lens 40a. The concave 38 and the partial caulking wall 36 of the lens frame 20a are formed circumferentially at three positions with a constant spacing therebetween. The concave 38 and the partial caulking wall 36 of the lens frame 20a are formed at the three locations which correspond to the V-shaped groove 41a of the first lens 40a.

The lens holding structure 10a is assembled as follows.

That is, similar to the first embodiment, first, the first lens 40a and the second lens 42 are inserted into the lens frame 20a, and they are positioned in the axial direction of the lens frame 20a.

Next, as shown by an arrow 62a of FIG. 5, a heated jig 50a is pressed against the partial caulking wall 36 of the lens frame 20a so as to thermally soften the partial caulking wall 36. At this time, as shown in FIG. 6, the softened partial caulking wall 36 is pressed into the groove 41a of the peripheral surface 40k of the first lens 40a.

Next, as shown by an arrow 64a of FIG. 6, in order to fix the first lens 40a to the lens frame 20a, the heated jig 50a is removed away from the partial caulking wall 36, and then the partial caulking wall 36 is let to be cooled down and is let to be hardened, with the partial caulking wall 36 being pressed against the V-shaped groove 41a of the first lens 40a.

Next, similar to the first embodiment, the second lens 42 is fixed to the lens frame 20a.

According to the arrangement of the second embodiment, the thickness of the partial caulking wall 36 is smaller than that of a body of the cylindrical wall 21 of the lens frame 20a. Therefore, the first lens 40a which is first installed inside the lens frame 20a, preceding the second lens 42, is fixed thereto by caulking, without enlarging the lens frame 20a in the radial direction.

By the way, because the groove 41a is formed entirely on the peripheral surface 40k of the first lens 40a, the rotational position of the first lens 40a about the optical axis relative to the lens frame 20a can be selected arbitrarily with the first lens 40a being mounted into the lens frame 20a.

Alternatively, instead of this arrangement, three grooves may be partly formed on the peripheral surface of the first lens 40a at positions which correspond to the three partial caulking walls 36 of the lens frame 20a. In this arrangement, it is necessary to select the rotational position of the first lens 40a about the optical axis relative to the lens frame 20a when the first lens 40a is mounted inside the lens frame 20a. With the arrangement, the rotation of the first lens 40a about the optical axis relative thereto is prevented more surely.

Figure 9:
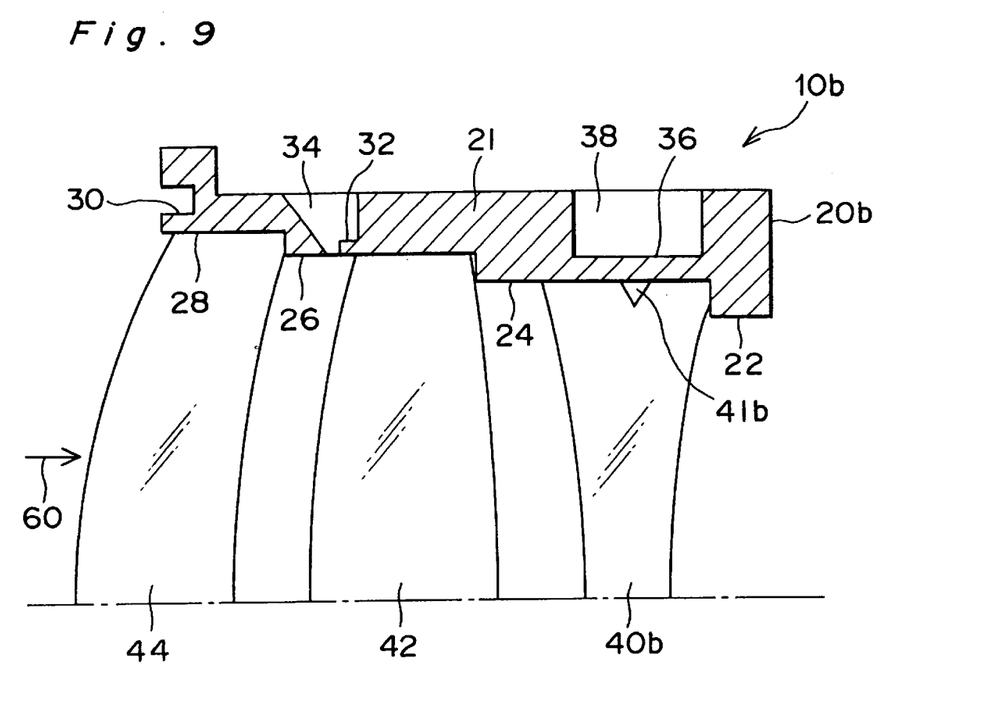
FIG. 9 is a sectional view showing a lens holding structure according to a third embodiment of the present invention.

Next, referring to FIG. 9, it is explained about a lens holding structure and its assembling method, according to a third embodiment of the present invention.

The lens holding structure 10b according to the third embodiment, has a lens frame 20b which holds a first lens 40b, a second lens 42, and a third lens 44. An outer diameter of the first lens 40b is smaller than that of the second lens 42, and the outer diameter of the second lens 42 is smaller than that of the third lens 44.

Meanwhile, the lens frame 20b has, in the direction opposite the direction in which the first lens 40b, the second lens 42b and the third lens 44 are inserted thereinto, a first inner peripheral surface 22, a second inner peripheral surface 24 which is adjacent to the first inner peripheral surface 22, a third inner peripheral surface 26 which is adjacent to the second inner peripheral surface 24 in which the second inner peripheral surface 24 is adjacent both the first inner peripheral surface 22 and the third inner peripheral surface 26 with the first inner peripheral surface 22 and the third inner peripheral surface 26 being separated from each other with a spacing corresponding to the second inner peripheral surface 24 therebetween in the axial direction, and a fourth inner peripheral surface 28 which is adjacent to the third inner peripheral surface 26 in which the third inner peripheral surface 26 is adjacent both the second inner peripheral surface 24 and the fourth inner peripheral surface 28 with the second inner peripheral surface 24 and the fourth inner peripheral surface 28 being separated from each other with a spacing corresponding to the third inner peripheral surface 26 therebetween in the axial direction.

The inner diameters of the first inner peripheral surface 22, the second inner peripheral surface 24, the third inner peripheral surface 26, and the fourth inner peripheral surface 28, increase in this order.

Furthermore, the inner diameter of the first inner peripheral surface 22 is smaller than the outer diameter of the first lens 40b. The inner diameter of the second inner peripheral surface 24 is generally equal to the outer diameter of the first lens 40b. The inner diameter of the third inner peripheral surface 26 is generally equal to the outer diameter of the second lens 42. The inner diameter of the fourth inner peripheral surface 28 is generally equal to the outer diameter of the third lens 44.

As shown in FIG. 9, an entire circumference caulking portion 30 is formed entirely around an end, of a cylindrical wall 21, from which the first through third lens 40b, 42 and 44 are inserted into the lens frame 20b one after another.

On an intermediate position in the axial direction of the cylindrical wall 21, three concaves 38 and three partial caulking walls 36, which are similar to those explained in the second embodiment, are circumferentially formed in correspondence to the first lens 40b; and three through-holes 34 and three caulking projections 32, which are similar to those explained in the first embodiment, are circumferentially formed in correspondence to the second lens 42.

The partial caulking wall portion 36 is formed on each of the concaves 38, and the partial caulking projection 32 is formed on each of the through-holes 34.

The lens holding structure 10b is assembled, similar to the first and second embodiments, as follows.

That is, the first, second, and third lenses 40b, 42, and 44 are inserted into the lens frame 20b in the axial direction from the side of the entire circumference caulking portion 30, as shown by the arrow 60.

Next, using an unshown heated jig, the partial caulking wall portion 36, the partial caulking projection 32, and the entire circumference caulking portion 30, are thermally deformed so that the first, second, and third lenses 40b, 42, and 44 are fixed to the lens frame 20b.

Namely, any desired number of lenses can be fixed to the lens frame by appropriately forming the partial caulking wall(s) and/or the partial caulking projection(s), as explained above, on the lens frame.

Referring to FIGS. 10 to 12, it is explained about a lens holding structure, and a method for determining a dimension of the lens holding structure, according to a fourth embodiment of the present invention.

The lens holding structure 101 according to the fourth embodiment has a lens holding part 122 of the lens frame 120, and a lens 110 which is held by the lens holding part 122 of an lens frame 120.

As shown in FIGS. 10 and 11, the lens frame 120 of the lens holding structure 101 has a projection 128 which projects inwardly and has a contact surface 126, as an upper surface of the projection 128, with which a peripheral surface 114 on one side of the lens 110 contacts so as to position the lens 110 in the optical direction, and has an inner peripheral surface 124 with an inner diameter ø1 that is greater than the outer diameter ø2 of a lens 110. In the arrangement, both the inner peripheral surface 124 and the contact surface 126 constitute a lens holding part 122 for holding the lens 110.

The lens 110 is fixed to the lens frame 120 with the above construction as follows.

That is, first, the lens 110 is inserted on the side of the lens holding part 122 of the lens frame 120, and the lens 110 is put on the contact surface 126 of the lens holding part 122.

Next, the lens 110 is properly moved relative to the contact surface 126 thereof in the radial direction of the lens 110 by using a lens pushing rod 130 as shown in FIG. 10, so that the lens 110 is positioned relative to the lens frame 120 with a condition in which a center of the lens frame 120 is aligned to an optical axis of the lens 110.

Next, using an adhesive applicator 132, an adhesive is filled between the lens holding part 122 and the lens 110 in order to fix the lens 110 to the lens holding part 122 of the lens frame 120, with the lens 110 being held in position relative to the lens holding part 122.

In the arrangement, there is a clearance or allowance in alignment (ø1−ø2) between the inner peripheral surface 124 of the lens frame 120 and the outer peripheral surface of the lens 110. The allowance in alignment (ø1−ø2) is the so-called "alignment allowance" therebetween. Within the alignment allowance, it is possible to adjust the lens 110 relative to lens frame 120 so as to realize the alignment therebetween.

As mentioned above, the inner diameter ø1 of the inner peripheral surface 124 of the lens frame 120 is larger than the outer diameter ø2 of the lens 110. In the arrangement, there is a following relation among a value Z (later explained in detail) of the lens 110, the outer diameter ø2 thereof, and the inner diameter ø1 of the lens holding part 122 of the lens frame 120:

$$3 \times 10^{-3} < Z \times (ø1-ø2)/ø1 < 10^{-2}$$

On the other hand, the method for determining the dimension of the lens holding structure comprises:

a first step for determining the configuration, or shape, of the lens 110; and a second step for determining the inner diameter ø1 of the inner peripheral surface 124 of the lens holding part 122 of the lens frame 120 so that the inner diameter ø1 thereof satisfies the relation:

$$3 \times 10^{-3} < Z \times (ø1-ø2)/ø1 < 10^{-2}$$

where ø2 indicates the outer diameter of the lens 110, and z indicates a value designating a characteristic of the lens 110 which has already been shaped or ground with the centering work as mentioned above.

The value Z is defined by an equation:

$$Z = |D1/(4 \times R1) \pm D2/(4 \times R2)|$$

where D1 is a diameter of a holder 102 supporting one surface 112 of the lens 110 at time of centering the lens 110; D2 is a diameter of another holder 103 supporting the other surface 114 of the lens 110 at time thereof; R1 is a radius of curvature of the one surface 112 of the lens 110; and R2 is a radius of curvature of the other surface 114 of the lens 110, as shown in FIG. 12.

In the above equation, in case that the lens 110 is a plane lens, a double-convex lens or a double-concave lens, a "+" sign is used; meanwhile, in case that the lens 110 is a meniscus lens, a "−" sign is used. Namely, in the first step, each of the parameters which are used to decide the value Z and the outer diameter ø2 of the lens 110 is determined.

Generally speaking, in case that the value Z is small and that the optical axis 104 of the lens 110 is not in alignment with the rotation axis 105 thereof at time of centering of the lens 110, the centering work of the lens 110 becomes difficult. This is because there is a small difference between the axial lengths L1 and L2 around the peripheral surface 116 of the lens 110.

Therefore, the alignment error δ, or the decentering amount δ, of the lens 110, becomes comparatively large, at time of mass-producing such a lens 110. Under such a situation, it is necessary to absorb the alignment error δ of the lens 110 by making the alignment allowance (ø1−ø2) larger.

By the way, in FIG. 11, a reference numeral 120s denotes the center of the lens frame 120; 104 denotes the optical axis of the lens 110; and 105 denotes the rotation axis of the lens 110 at time of centering.

On the other hand, in case that the value Z is larger, the centering work of the lens 110 is easier. This is because there arises a greater difference between the axial lengths L1 and L2 around the peripheral surface 116 of the lens 110, in case that the optical axis 104 of the lens 110 is not in alignment with the rotation axis 105 thereof at time of centering work of the lens 110.

Therefore, the alignment error δ becomes comparatively smaller at time of mass-producing such a lens 110. Under such a situation, it is possible to absorb the alignment error δ of the lens 110, even if the alignment allowance (ø1−ø2) is smaller.

Paying attention to the relation between the alignment allowance (ø1−ø2) and the value of "Z", the inventors et al. examined the mass-produced lenses which are processed with general accuracy. As a result, the inventors et al. found out the relation between the value "Z" and the alignment allowance (ø1−ø2), as defined by:

$$3 \times 10^{-3} < Z \times (ø1-ø2)/ø1 < 10^{-2}$$

Therefore, a mass-produced lens which fails in centering, i.e. a decentering lens, can be mounted on its lens frame with the optical axis of the decentering lens being aligned relative to the center of the lens frame, by determining the dimension of the lens holding structure on the basis of the above relation.

That is, the value "Z" and the dimensionless alignment allowance (ø1−ø2)/ø1 are generally inversely proportional to each other. Thus, in case that the value "Z" is small, i.e., in case that the alignment error δ of the lens 110 is comparatively large, it is possible to make the inner diameter ø1 of the lens holding part 122 of the lens frame 120 large, so as to make the alignment allowance (ø1−ø2)/ø1 large.

On the other hand, in case that the value "Z" is large, i.e., in case that the alignment error δ of the lens 110 is comparatively small, it is possible to make the inner diameter ø1 of the lens holding part 122 of the lens frame 120 small, so as to make the alignment allowance (ø1−ø2)/ø1 small.

At step 2, based on the dimension of the lens 110 which is determined at step 1, the inner diameter ø1 of the lens holding part 122 of the lens frame 120 is so determined that the above relation is satisfied.

It becomes unnecessary to make the inner diameter ø1 of the lens holding part 122 of the lens frame 120 more than is required by satisfying the above conditional relation.

Also, such an inconvenience does not occur, as the inner diameter ø1 of the lens holding part 122 is too small, the alignment allowance (ø1−ø2) is not sufficient, and it is not possible to align the optical axis of the lens with respect to the center of the lens frame.

Namely, with the aforementioned conditional relation, it is possible to determine the dimension of the lens holding structure so as to keep a suitable alignment allowance (ø1−ø2).

In other words, the lens holding structure which is so constructed as to satisfy the conditional relation, has an appropriate alignment allowance.

Although the lens or lenses explained in the above embodiments are inserted inside the lens frame only in one direction from the entire circumference caulking portion of the lens frame, the construction is not limited to the embodiments. For example, alternatively, it is possible to construct the lens holding structure that a plurality of lenses are able to be inserted into the lens frame from both sides thereof.

Although the present invention has been fully described in connection with the preferred embodiments thereof with reference to the accompanying drawings, it is to be noted that various other changes and modifications are apparent to those skilled in the art. Such changes and modifications are to be understood as included within the scope of the present invention as defined by the appended claims unless they depart therefrom.

What is claimed is:

1. A lens holding structure comprising:
    a lens frame; and
    a plurality of lenses which are held by the lens frame, in which at least a pair of the lenses are mounted on the lens frame by inserting them into the lens frame in a same axial direction of the lens frame,
    wherein the lens frame comprises a plastically deformable part which is provided generally at a central part thereof relative to the axial direction, in which the central part thereof relative thereto generally corresponds to a location of a first lens which is first mounted on the lens frame, and in which the plastically deformable part is exposed outside, and
    wherein the plastically deformable part is deformed plastically toward the first lens so that the first lens is fixed relative to the lens frame.

2. The lens holding structure as claimed in claim 1, wherein the lens frame further comprises a cylindrical wall with a through-hole penetrating the cylindrical wall generally in a radial direction of the first lens and with a partial caulking piece projecting inside the through-hole,
    wherein the through-hole is defined by an upstream inner surface relative to the same axial direction and by a downstream inner surface relative thereto, in which the partial caulking piece is located on a side of the upstream inner surface and projects, from a vicinity of a downstream edge of the first lens, in a direction opposite to the same axial direction, and in which the downstream inner surface slants inwardly relative to the same axial direction, and
    wherein the partial caulking piece is deformed plastically, as the plastically deformable part, generally in the radial direction of the first lens so that the partial caulking piece engages the downstream edge of the first lens.

3. The lens holding structure as claimed in claim 1, wherein the first lens has a peripheral groove,
    wherein the lens frame has a concave part which is recessed relative to an outer surface of the lens frame, in which the concave part has a thin partial caulking wall part on a side of the first lens, and in which the concave part is provided at a location corresponding to the peripheral groove of the first lens, and
    wherein the thin partial caulking wall part is deformed plastically, as the plastically deformable part, generally in the radial direction of the first lens so that the thin partial caulking wall part engages the peripheral groove of the first lens.

4. The lens holding structure as claimed in claim 1, wherein the lens frame has at least a pair of the plastically deformable parts in a circumferential direction of the lens frame.

5. A method for assembling a lens holding structure in which a plurality of lenses are held by a lens frame thereof, in which at least a pair of the lenses are mounted on the lens frame by inserting them into the lens frame in a same axial direction of the lens frame, wherein the lens frame has a plastically deformable part which is provided generally at a central part thereof relative to the axial direction, in which the central part thereof relative thereto generally corresponds to a location of a first lens which is to be first mounted on the lens frame, and in which the plastically deformable part is exposed outside, the method comprising the steps of:
    providing the first lens into the lens frame in the same axial direction; and
    deforming the plastically deformable part plastically toward the first lens so that the first lens is fixed relative to the lens frame.

6. The method as claimed in claim 5, wherein the lens frame further comprises a cylindrical wall with a through-hole penetrating the cylindrical wall generally in a radial direction of the first lens and with a partial caulking piece projecting inside the through-hole,
    wherein the through-hole is defined by an upstream inner surface relative to the same axial direction and by a downstream inner surface relative thereto, in which the partial caulking piece is located on a side of the upstream inner surface and projects, from a vicinity of a downstream edge of the first lens, in a direction opposite to the same axial direction, and in which the downstream inner surface slants inwardly relative to the same axial direction, and
    wherein the partial caulking piece is deformed plastically, as the plastically deformable part, generally in the radial direction of the first lens so that the partial caulking piece engages the downstream edge of the first lens.

7. The method as claimed in claim 5, wherein the first lens has a peripheral groove,
    wherein the lens frame has a concave part which is recessed relative to an outer surface of the lens frame, in which the concave part has a thin partial caulking wall part on a side of the first lens, and in which the concave part is provided at a location corresponding to the peripheral groove of the first lens, and
    wherein the thin partial caulking wall part is deformed plastically, as the plastically deformable part, generally in the radial direction of the first lens so that the thin partial caulking wall part engages the peripheral groove of the first lens.

8. The method as claimed in claim 5, wherein the lens frame has at least a pair of the plastically deformable parts in a circumferential direction of the lens frame.

9. A lens holding structure comprising:
    a lens frame with a lens holding part which has an inner diameter $ø1$; and
    a lens, having an outer diameter $ø2$ which is smaller than the inner diameter $ø1$ of the lens frame, in which the lens is supported by the lens holding part of the lens frame, and in which an optical axis of the lens can be aligned with respect to a center of the lens holding part of the lens frame,
    wherein there is a relation expressed by:

$$3 \times 10^{-3} < Z \times (ø1-ø2)/ø1 < 10^{-2} \text{ and}$$

$$Z = |D1/(4 \times R1) \pm D2/(4 \times R2)|$$

where ø1 is the inner diameter of the lens holding part of the lens frame; ø2 is the outer diameter of the lens; D1 is a diameter of one of a pair of holders which supports one of a pair of surfaces of the lens at time of centering the lens; D2 is a diameter of the other of the pair of holders which supports the other of the pair of surfaces of the lens at time thereof; R1 is a radius of curvature of the one of the pair of surfaces of the lens; R2 is a radius of curvature of the other of the pair of surfaces of the lens; its plus sign is used where the lens is one of a plane lens, a double-convex lens and a double-concave lens; and its minus sign is used where the lens is a meniscus lens.

10. A method for determining a dimension of a lens holding structure which has:

a lens frame with a lens holding part which has an inner diameter ø1; and a lens, having an outer diameter ø2 which is smaller than the inner diameter ø1 of the lens frame, in which the lens is supported by the lens holding part of the lens frame, and in which an optical axis of the lens can be aligned with respect to a center of the lens holding part of the lens frame, the method comprising the steps of:

determining a shape of the lens; and determining the inner diameter ø1 of the lens holding part of the lens so as to satisfy a relation expressed by:

$$3 \times 10^{-3} < Z \times (\text{ø}1 - \text{ø}2)/\text{ø}1 < 10^{-2} \text{ and}$$

$$Z = |D1/(4 \times R1) \pm D2/(4 \times R2)|$$

where ø1 is the inner diameter of the lens holding part of the lens frame; ø2 is the outer diameter of the lens; D1 is a diameter of one of a pair of holders which supports one of a pair of surfaces of the lens at time of centering the lens; D2 is a diameter of the other of the pair of holders which supports the other of the pair of surfaces of the lens at time thereof; R1 is a radius of curvature of the one of the pair of surfaces of the lens; R2 is a radius of curvature of the other of the pair of surfaces of the lens; its plus sign is used where the lens is one of a plane lens, a double-convex lens and a double-concave lens; and its minus sign is used where the lens is a meniscus lens.

* * * * *